3,403,989
PRODUCTION OF BRIQUETTES FROM CALCINED CHAR EMPLOYING ASPHALT BINDERS AND SUCH BRIQUETTES
John H. Blake, Portola Valley, Calif., and Frank Philip McCandless, Bozeman, Mont., assignors to FMC Corporation, New York, N.Y., a corporation of Delaware
No Drawing. Continuation-in-part of application Ser. No. 395,317, Sept. 9, 1964. This application Oct. 31, 1966, Ser. No. 590,509
7 Claims. (Cl. 44—23)

ABSTRACT OF THE DISCLOSURE

Carbonaceous briquettes having high mechanical strength and a homogeneous structure are produced from calcined coal char and a particular bituminous binder. The binder comprises an asphalt obtained as a residue from the thermal cracking of petroleum oils, having an asphaltene content of from 40% to 85% by weight, a softening point of from 100° to 225° F., a carbon to hydrogen atomic ratio of from about 0.9 to 1.4, and being at least 90% soluble in benzene.

---

This is a continuation-in-part of our copending application Ser. No. 395,317, filed Sept. 9, 1964 and now abandoned.

This invention relates to briquettes produced from calcined coal char and a bituminous binder. In a more particular sense, the invention pertains to the production of briquettes from calcined coal char particles and a bituminous binder at least part of which is asphalt having properties capable of imparting high mechanical strength to the briquette whereby the latter is suitable for charging to metallurgical furnaces.

In the FMC Cope process disclosed and claimed in U.S. Patents 3,140,241 and 3,140,242 granted July 7, 1964, bituminous coal, including non-coking coals, of a particle size less than 6 mesh and preferably less than 16 mesh with the average particle size in the range of from 40 to 60 mesh, is heated in the presence of oxygen, which may be derived from the coal itself in the case of the so-called high oxygen-containing coals, i.e., coals having an excess of 15% by weight of oxygen, to a temperature high enough to drive off substantially all moisture but below that at which substantial amounts of tar-forming vapors evolve. Thereafter the coal particles from this heat treatment are heated to a higher temperature at which tar-forming vapors are evolved and for a time interval sufficient to effect polymerization of the heated coal particles and evolution therefrom of substantially all of the tar-forming vapors to produce a char of markedly lower volatile combustible material content than the parent coal and substantially free of tar-forming vapors. This char is heated to a still higher temperature to produce the calcined char particles for blending with the bituminous binder.

The calcined char is mixed with the binder in the proportions of from 75% to 90% calcined char to 25% to 10% binder. These percentages are based on the weight of the total mix. In this specification all percentages and part values are given on a weight basis unless otherwise indicated. All mesh sizes are in terms of the United States Sieve Series (United States Bureau of Standards).

Preferred binders for the FMC Coke process are coal tar pitch or pitches produced by the condensation of tars from the gases evolved during the carbonization and the subsequent dehydration, stripping, and/or oxidation of the resultant tars to produce pitches having a softening point of from 100° to 225° F. (ASTM Ring and Ball).

The blend of calcined char and binder is compressed to produce the green briquettes which are then cured in an atmosphere containing oxygen to bring about copolymerization of the binder and the char so as to make the briquettes strong and infusible. The cured briquettes are coked to produce briquettes suitable for metallurgical purposes. The briquettes thus produced, when observed even under a relatively low power magnification, are of uniform composition, i.e., as a general rule the carbon derived from the calcined char and that derived from the bituminous binder are indistinguishable.

A more detailed description of the FMC Coke process is given in U.S. Patents 3,140,241 and 3,140,242, the disclosure of which is incorporated herein by reference.

When producing briquettes from bituminous coals having insufficient volatile matter to furnish enough tar to supply the binder requirements for the process, a supplemental source of a suitable binder must be used. Many bituminous binders, including paraffinic asphalts and some asphalts ordinarily used for making green briquettes, when used alone or when blended with the pitch binder derived from the tar produced in the carbonization stage of the process are unsatisfactory because the binder will not polymerize (or copolymerize) sufficiently well in the oxidative curing step to harden the green briquette and cause it to become infusible. In some cases, these unsatisfactory binders solidify during oxidative curing, but they do not bond the char particles together sufficiently well to give a strong cured briquette. In either case, the result is cured briquettes having low crushing strength which on coking are unsatisfactory for metallurgical purposes.

It is accordingly a principal object of the present invention to provide for the calcined char a binder having such properties that is compatible in all proportions with pitch binders derived from the tar obtained in the carbonization stage of the process and which binder can be used alone or blended with coal tar pitch binders heretofore used as a binder for the calcined char and when so used alone or as a blend, results in cured and coked briquettes having crushing strength and structure at least as good as, if not better than, the crushing strength comparable of briquettes produced from the calcined char and coal tar pitch binders heretofore employed.

Other objects and advantages of this invention will be apparent from the following detailed description thereof.

We have found that the objects aforesaid can be realized by using at least as part of the binder for the calcined char asphalts having an asphaltene content of from 40% to 85%, at least about 90% of which asphalts are soluble in benzene, a softening point of from 100° to 225° F., preferably 130° to 160° F., a carbon to hydrogen (atom/atom) ratio of from about 0.9 to 1.4, preferably from 1 to 1.3, obtained as a residue from the thermal cracking of petroleum oils. These asphalts will be hereinafter referred to as "Asphalt Binders." They are compatible with coal tar pitch in all proportions. Hence they can be used to supply the deficiencies of tar production in any installation employing coals having insufficient volatile matter to furnish enough tar to produce the pitch binders for briquetting all of the calcined char produced.

The amount of Asphalt Binder blended with coal tar pitch binders produced from the tar recovered in the process in any given installation will, in general, depend on the extent of the deficiency of the tar production of such installation. This will vary for each installation depending chiefly on the coal treated, the recovery and processing equipment employed for recovering the tar and producing the pitch binder therefrom, and the amount of binder employed within the range of from 10% to 25% in producing the briquettes. In general, a blend of pitch binder and the Asphalt Binder containing up to 50% Asphalt Binder and the rest pitch binder will give an adequate supply of binder for the requirements of the FMC Coke process taking into account variations in the volatile content of available coals. The Asphalt Binder can be mixed with the coal tar pitch binder in proportions of 95% to 5% Asphalt Binder, preferably 5% to 50%, and 5% to 95%, preferably 50% to 5% coal tar pitch binder having a softening point of 100° to 225° F. An all asphalt binder, rather than a blend with coal tar pitch, can be used, if desired, and results in good cured and coked briquetes having crushing strength as good if not better than those produced from the same calcined char using an all coal tar pitch binder. The use, however, of all Asphalt Binder is not preferred, chiefly because of the economic loss involved when the tar produced in the process is not employed in forming the binder and thus is not converted into briquettes.

By the asphaltene content of the asphalt is meant the proportion of the asphalt insoluble in n-pentane. The percentage values for asphaltene given herein were determined by ascertaining the proportion of the asphalt which remains undissolved after thorough mixing with n-pentane.

The oil content of the asphalt is that portion which is soluble in n-pentane and is not adsorbed from the pentane solution by activated alumina. The resin content is soluble in n-pentane but it is adsorbed from it by activated alumina.

The Asphalt Binders used can be any of the commercially available asphalts produced as residue from the thermal cracking of petroleum oils by any of the several processes in use having an appreciable aromatic content and having the properties above set forth. Paraffinic asphalts, asphalts obtained as residues from the vacuum or steam distillation of straight run petroleum oils, and these asphalts thickened by air-blowing or oxidation are unsuitable.

Examples of satisfactory commercial asphalts which can be used as Asphalt Binders are the following:

(1) Asphalts having an asphaltene content of 78% to 81%, a resin content of 3.5% to 4%, an oil content of 15% to 18%, a softening point of about 150° F., and a carbon to hydrogen atomic ratio of 1.28. These asphalts are sold by the Mobil Oil Company under the designation #B7206; they will be referred to hereinafter as AB I;

(2) Asphalts having an asphaltene content of 77% to 78%, a resin content of 2% to 4%, an oil content of 19% to 20%, a softening point of about 156° F., and a carbon to hydrogen atomic ratio of 1.22. These asphalts are sold by the Mobil Oil Company under the designation #7060; they will be referred to hereinafter as AB II.

(3) Asphalts having an asphaltene content of 69% to 71%, a resin content of 4% to 5%, an oil content of 25% to 26%, a softening point of 139° F., and a carbon to hydrogen atomic ratio of 1.08. These asphalts are sold by the Marathon Oil Company under the designation #63128; they will be referred to hereinafter as AB III.

All of these asphalts are produced as residues from the thermal cracking of petroleum oils; they contain appreciable amounts of aromatics and all are at least 90% soluble in benzene.

The Asphalt Binder is blended with the calcined char in the proportions of from 75% to 90% calcined char and from 10% to 25% binder based on the weight of the total mix at a temperature of from 30° to 60° F. above the softening point of the binder. The blend is formed into shapes hereinafter referred to as "briquettes" by extrusion or briquetting under pressures in excess of 5000 p.s.i. The maximum pressure usable and desirable depends on the size of the shapes and the type of equipment used. The resultant green briquettes are cured in an atmosphere containing from 2.5% to 21% oxygen (e.g., air). Curing hardens and strengthens the briquettes by converting the binder to an infusible polymer. As disclosed in said Patents 3,140,241 and 3,140,242, the curing can be carried out at a temperature of from 450° to 500° F. for 90 to 180 minutes, preferably about two hours. The cured shapes, if desired, can be coked at temperatures above 1500° F. for at least five minutes in an atmosphere substantially free of carbon dioxide, water vapor and oxygen. At 1500° F. a minmum time of about 15 minutes is required; at 1700° F. a minimum time of 10 minutes is required. At 1500° F. coking can be continued for about one hour without loss of reactivity. At 1700° F. coking can be continued for about 40 minutes without loss of reactivity.

The cured briquetes can be used if desired without subjecting them to the coking treatment, when they are made by employing the Asphalt Binder alone or by use of a blend of the asphalt with coal tar pitch obtained from the tar produced in the process, the blend being composed of any desired proportions of the two components; the amount of Asphalt Binder blended with the coal tar pitch will depend on the deficiency of coal tar pitch binder. Cured briquettes are thus obtained which are infusible and have adequate strength for use, for example, in cupolas and blast furnaces. Actually the coking of these cured briquettes takes place within the furnace; the temperature conditions in cupola and blast furnaces are such as to effect coking of the cured briquettes which are then consumed in effecting the smelting and refining of the charge within the furnace.

By thus operating in accordance with the invention, the art is provided with a method of preselecting an asphalt binder for use with calcined coal char whereby briquettes of consistently high mechanical strength can be realized. Moreover, it now becomes possible to utilize asphalts which were heretofore unsuitable as binders by blending them with asphalts whose parameters are in the upper range and thereby obtain blends or mixtures having the requisite physical and chemical properties set forth herein, namely a softening point within the range of from about 100° F. to about 225° F., preferably from about 130° F. to about 160° F., a carbon to hydrogen atomic ratio of at least 0.9, an asphaltene content of at least 40%, at least 90% of which is benzene soluble.

Examples of asphalts not suitable as binder material when used along but which give satisfactory blends with asphalts having the upper range of parameters are the following:

(a) Briquetting asphalts having an asphaltene content of 42.5%, a resin content of 9.5%, an oil content of 48.0%, and a carbon to hydrogen atomic ratio of 0.728;

(b) Steam-refined asphalts having an asphaltene content of 41.5%, a resin content of 12.9%, an oil content of 45.6%, a softening point of 170° F., and a carbon to hydrogen atomic ratio of 0.716;

(c) The so-called "dead level" asphalts having an asphaltene content of 34.8%, a resin content of 12.1%, an oil content of 53.1%, a softening point of 144° F., and a carbon to hydrogen atomic ratio of 0.660;

(d) Paraffinic asphalts having an asphaltene content of 27.1%, a resin content of 21.2%, an oil content of 51.7%, and a softening point of 140° F.;

(e) Air-blown or oxidized asphalts having an asphaltene content of 58.9%, a resin content of 13.3%, an oil content of 27.8%, a softening point of 228° F., and a carbon to hydrogen atomic ratio of 0.676.

These asphalts ((a) through (e) above) either do not solidify during oxidative curing and/or largely volatilize on subsequent coking to give a poorly bonded product.

The following examples are given to exemplify the present invention. For comparative purposes, there is also given the crushing strength and description of coke briquettes made with other binders.

In all cases the calcined char employed was produced from Elkol coal by the FMC Coke process involving a three stage processing, namely, catalyzing, carbonizing and calcining, in fluid bed reactors as disclosed in U.S. Patents 3,140,241 and 3,140,242. The calcined char thus produced contained approximately 3% volatile matter on a moisture and ash free basis, about 7% ash, and had a bulk density of 38.4 pounds per cubic foot. The calcined char used had a particle size such that it all passed through a 10 mesh screen.

In all cases 15% by weight of binder was thoroughly mixed with the calcined char at a temperature of from 195° to 250° F., depending on the softening point of the binder. Briquettes each weighing about 13 grams were made by compressing the warm mix into a 1⅛ inch ID cylinder at 15,000 p.s.i., using a hydraulic hand press. The briquettes thus produced were cylinders 1⅛ inches in diameter and about 0.8 inch high. They were cured in air for 2 hours at 230° C. in a forced convection oven and then coked for 20 minutes in an inert atmosphere at 950° C. in an electrically heated muffle furnace. The curing was carried out in a wire mesh container to insure good circulation of the current of hot air around the individual briquettes.

The strength of the coke briquettes was measured by crushing the briquettes in a Riehle Universal Testing Machine with the bottom plate movement set at 0.35 inch per minute. The load causing the first downward deflection of the indicator was taken as the crushing strength. The results reported are the average strength of five briquettes in each batch. The results are given in the tables which follows:

TABLE I.—INVENTION

| Example No. | Binder | Briquette strength, p.s.i. |
|---|---|---|
| I | AB I | 5,647 |
| II | AB II | 5,441 |
| III | AB III | 5,572 |
| IV | A blend of AB II and a paraffinic asphalt ([d] above), the blend containing 75.3% AB II. | 5,300 |
| V | A blend of AB I and the asphaltic residue from an uncracked Wyoming crude (Mobil Oil Co. #B7208), the blend containing 41.0% AB I. | 5,240 |
| VI | Blend of AB I and topped coal tar binder obtained from the carbonization of Elkol coal, the blend containing 75% AB I and 25% coal tar binder. | 5,300 |

TABLE II.—COMPARISON

| Test No. | Binder | Briquette strength, p.s.i. |
|---|---|---|
| A | Oxidized asphalt | 2,920 |
| B | Asphalt from Wyoming crude, not cracked (Mobil Oil Co. #B7208) | 3,370 |
| C | Paraffinic asphalt ([d] above) | 3,516 |
| D | "Dead level" asphalt ([c] above) | 4,046 |
| E | Steam reduced asphalt ([b] above) | 4,332 |
| F | Briquetting asphalt ([a] above) | 4,012 |

The briquettes thus produced by the present invention (Table I) were of homogeneous composition, that is, a fractured surface was smooth, with the fracture plane going through rather than around the original char particles, the fractured surface had a bright metallic lustre, and carbon from the binder could not be readily distinguished from that of the original char particles. These coked briquettes had all of the other desirable properties of coke briquettes produced by the FMC Coke process.

By contrast briquettes made from unsatisfactory binders (Table II), gave a surface fracture which was generally dull, black, and took place by pulling apart adjoining char particles. The original particles appeared to be part of a poorly cemented matrix. The crushing strength of the briquettes made with the Asphalt Binder was somewhat greater than those briquettes made under the same conditions except for the use of the same relative amount of coal tar pitch binder.

It will be noted from the above comparative data that the Asphalt Binders are unique. Surprisingly and unexpectedly, the Asphalt Binders result in coke briquettes having high crushing strength and a homogeneous structure; an increase in the crushing strength of from 30% to 40% is obtained over and above the crushing strength of those coke briquettes made under the same conditions but with petroleum derived binders not conforming to the specifications of this invention.

Why the Asphalt Binders should give such increase in the crushing strength and so homogeneous a structure to the coked briquettes is not understood. It may be due to a high content of condensed ring aromatic compounds indicated by the high asphaltene content and relatively high carbon to hydrogen atomic ratio, which high content of condensed ring aromatic compounds results in better copolymerization with the calcined char during the curing treatment with consequent better bonded briquettes upon subsequent coking. This explanation is advanced to give a better understanding of the invention; it will be appreciated that the invention is not limited to this explanation.

The expression "briquettes" is used herein in a broad sense to include extrusions and other shapes produced by blending the binder with calcined char and shaping the resultant blend. The expression "coal tar pitch" is used herein in a broad sense and includes "topped" or "dehydrated" tar binders from both low temperature and high temperature coal tars.

Since certain changes in carrying out the process of producing briquettes and in the resultant briquettes which embody this invention can be made wtihout departing from the scope of this invention, it is intended that all matter contained in the above description shall be interpreted as illustrative and not in a limiting sense.

What is claimed is:
1. The process of producing strong, infusible, homogeneous briquettes which comprises blending from 75% to 90% by weight of calcined char derived from coal with from 10% to 25% binder based on the weight of the total mix, the binder containing asphalt having an asphaltene content of from 40% to 85% by weight, at least 90% of the asphalt being soluble in benzene, having a softening point of 100° to 225° F., a carbon to hydrogen atomic ratio of about 0.9 to 1.4, and obtained as a residue from the thermal cracking of petroleum oils, subjecting the resultant blend to pressure to produce green briquettes, and curing the green briquettes in an oxygen-containing atmosphere.

2. The process of claim 1, in which the asphalt binder has a softening point of from 130° to 160° F. and a carbon to hydrogen atomic ratio of 1 to 1.3.

3. The process of claim 1, in which the binder for the calcined char is a mixture of coal tar pitch having a softening point of from 100° to 225° F. and said asphalt.

4. The process of producing strong, infusible, homogeneous, carbonaceous briquettes suitable for us as metallurgical coke which comprises blending from 75% to 90% by weight of calcined char derived from coal with from 10% to 25% binder based on the weight of the total mix, the binder containing asphalt having an asphaltene content of from 40% to 85% by weight, at least 90% of the asphalt being soluble in benzene, having a softening point of 100° to 225° F., a carbon to hydrogen atomic ratio of about 0.9 to 1.4, and obtained as a residue from the thermal cracking of petroleum oils, subjecting the resultant blend to pressure to produce green briquettes, curing the green briquettes in an oxygen-containing atmosphere, and coking the cured briquettes at a temperature above 1500° F. in an atmosphere substantially free of carbon dioxide, water vapor and oxygen for at least five minutes.

5. Carbonaceous briquettes having high mechanical strength and a homogeneous structure and which are infusible, constituted of carbonaceous material derived from coal and a bituminous binder, said binder being derived in part at least from an asphalt having an asphaltene content of from 40% to 85% by weight, a softening point of from 100° to 225° F., a carbon to hydrogen atomic ratio of from about 0.9 to 1.4, at least 90% of said asphalt being soluble in benzene, said asphalt being obtained as a residue from the thermal cracking of petroleum oils.

6. Carbonaceous briquettes as defined in claim 5 in which the said asphalt has a softening point of from 130° to 160° F. and a carbon to hydrogen atomic ratio of from 1 to 1.3.

7. Carbonaceous briquettes as defined in claim 5 in which the binder is derived from a mixture containing from 5% to 95% by weight of coal tar pitch and from 95% to 5% by weight of said asphalt.

References Cited

UNITED STATES PATENTS

| | | | |
|---|---|---|---|
| 2,370,060 | 2/1945 | Mead | 44—23 |
| 2,690,420 | 9/1954 | Mack | 208—22 |
| 2,838,385 | 6/1958 | Brown | 44—23 |
| 3,001,856 | 9/1961 | Reerink et al. | 44—23 |
| 3,051,628 | 8/1962 | Gorin et al. | 44—19 XR |

DANIEL E. WYMAN, *Primary Examiner.*

C. F. DEES, *Assistant Examiner.*